(12) United States Patent
Bhattacharya et al.

(10) Patent No.: US 8,813,209 B2
(45) Date of Patent: Aug. 19, 2014

(54) AUTOMATING NETWORK RECONFIGURATION DURING MIGRATIONS

(75) Inventors: Kamal Bhattacharya, Haryana (IN); Birgit Pfitzmann, Valhalla, NY (US); Nikolai A. Joukov, Thornwood, NY (US); HariGovind V. Ramasamy, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/793,202

(22) Filed: Jun. 3, 2010

(65) Prior Publication Data

US 2011/0302647 A1    Dec. 8, 2011

(51) Int. Cl.
*G06F 21/00*    (2013.01)

(52) U.S. Cl.
USPC ............... 726/11; 726/2; 709/202; 709/221; 709/222

(58) Field of Classification Search
USPC ..................... 709/220–222; 726/11
See application file for complete search history.

(56) References Cited

U.S. PATENT DOCUMENTS

| | | | |
|---|---|---|---|
| 6,704,873 B1* | 3/2004 | Underwood | 726/12 |
| 8,572,625 B2* | 10/2013 | Huang et al. | 718/105 |
| 2005/0289308 A1* | 12/2005 | Kano | 711/161 |
| 2006/0129670 A1* | 6/2006 | Mayer | 709/223 |

FOREIGN PATENT DOCUMENTS

CN    101783873 A    7/2010

OTHER PUBLICATIONS

Jann et al "Web applications and dynamic reconfiguration in UNIX servers" Mar. 2003 Proceedings of the 2003 IEEE International Symposium on Performance Analysis of Systems and Software; IEEE computer society.*
"Optimizing tree reconfiguration for mobile target tracking in sensor networks"; Zhang et al; INFOCOM 2004. Twenty-third Annual Joint Conference ; IEEE Infocom 2004; 12 pages.*

* cited by examiner

*Primary Examiner* — Jason Lee
(74) *Attorney, Agent, or Firm* — Scully, Scott, Murphy & Presser, P.C.; Louis J. Percello, Esq.

(57) ABSTRACT

Automating network reconfiguration such as firewall reconfiguration in migrations may include determining network reconfiguration needs in one or more network functionalities of the target environment based on the discovering; and applying the network reconfiguration needs to the one or more network functionalities in the target environment.

20 Claims, 8 Drawing Sheets

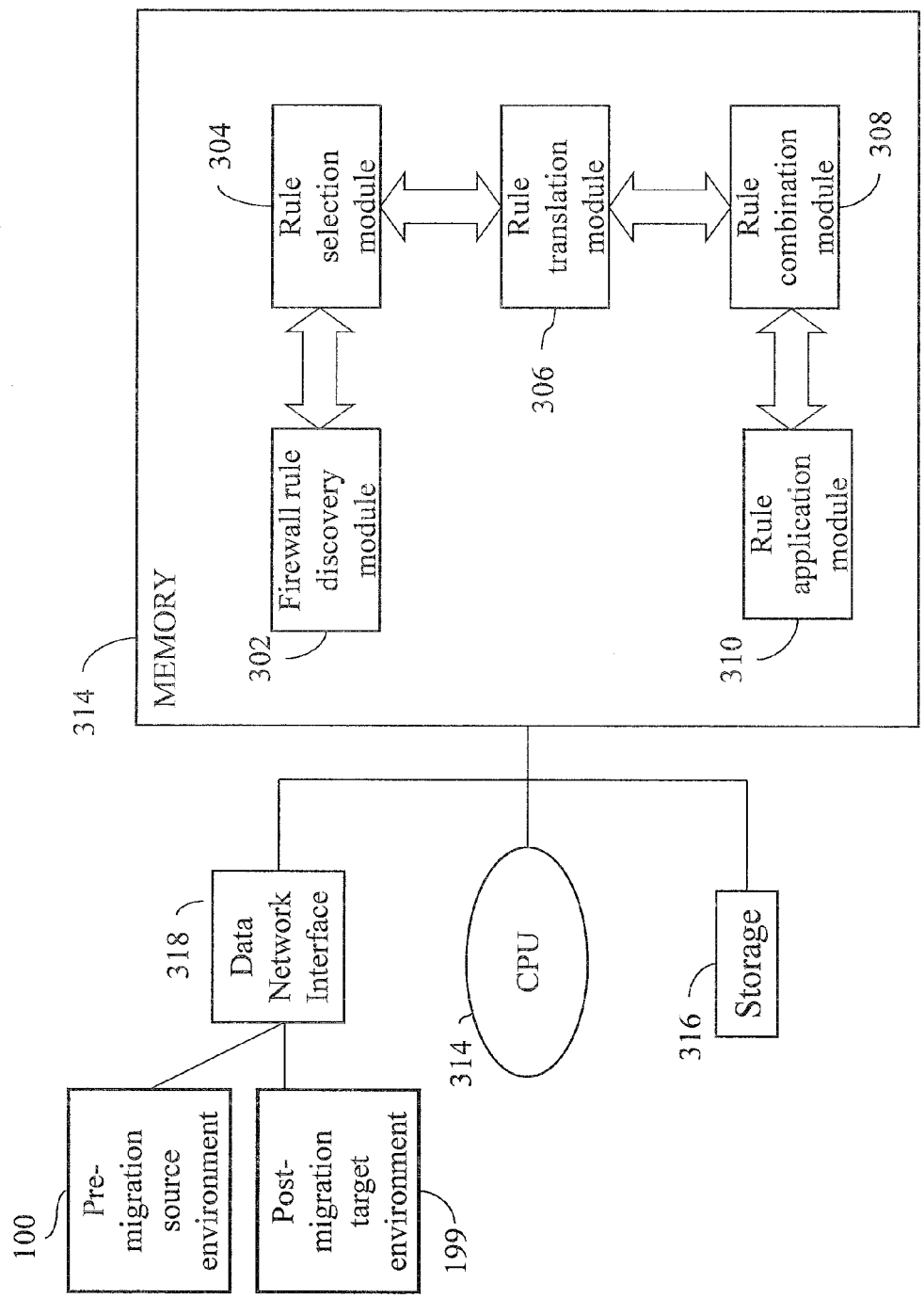

AUTOMATING NETWORK RECONFIGURATION DURING MIGRATIONS

FIELD

The present application generally relates to computer systems, and computer system service technologies and information technology (IT) transformation tasks.

BACKGROUND

Migration, consolidation, virtualization, and cloudification are some of the information technology (IT) transformation tasks, particularly involved with the current era of cost savings and green data centers. In this disclosure, those and the like tasks are collectively referred to as "migration." A task in migration includes the discovery of dependencies or affinities, i.e., what components (servers, applications, application modules, databases, etc.) interact with what other components via the network.

In migrating components to a target environment with different addresses (such as IP addresses or domain names in the context of the Domain Name Service) and possibly a different network topology, the firewall configurations in the target environment need to be set such that all components that need to interact can still interact, but without opening too many unnecessary communication paths. "Firewall reconfiguration", for instance, refers to reconfiguring or setting of firewall parameters in the target environment so that the components in the target environment after the migration can still interact. Firewall reconfiguration is currently done manually, often even without access to a detailed representation of the dependencies in the source environment.

Migrating applications to a new network should still allow the interactions to happen seamlessly, for example, enable the new firewalls or the like to allow the migrated applications to function as before.

Wrong firewall reconfiguration in the sense of a missing "allow" rule is a significant source of errors that show up later in end-to-end testing and are difficult to identify and fix, thus contributing to long migration schedules and high migration costs. For those reasons, many enterprises continue to shy away from migrations. Vice versa, making too many "allow" rules in the target environment might open the target environment to more types of attacks than necessary and than what was possible in the source environment.

BRIEF SUMMARY

A method and system for automating network reconfiguration in migrations are provided. The method, in one aspect, may include determining network reconfiguration needs in one or more network functionalities of target environment based on one or more network-level attributes associated with source environment and one or more network-level attributes associated with target environment of one or more components being migrated. The method may also include applying the network reconfiguration needs to the one or more network functionalities in the target environment.

A system for network reconfiguration in migrations, in one aspect, may include a module operable to determine network reconfiguration needs in one or more network functionalities of target environment based on one or more network-level attributes associated with source environment and one or more network-level attributes associated with target environment of one or more components being migrated. The system may also include a rule application module operable to apply the network reconfiguration needs to the one or more network functionalities in the target environment.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIGS. 3A and 3B illustrate various functional components of a system for performing network and/or firewall reconfiguration in migrations in one embodiment of the present disclosure.

DETAILED DESCRIPTION

A method and system to automatically perform network reconfiguration, e.g., modify network-level parameters such as firewall related parameters to reconfigure firewall setting, associated with components during and/or after migration, are disclosed. The firewall reconfiguration of the present disclosure may also set firewall parameters associated with the components for migration. For instance, if the target environment is a new data center, the firewalls are configured from scratch. In one aspect, network level information for all components involved in a migration are automatically discovered and firewall reconfiguration is applied so that migrated components function and provide their functionalities as before the migration to a new computing environment, while allowing a minimum number of unnecessary open connections through the firewalls for security.

The disclosed system and method may automatically propose or even silently set the correct new firewall configurations and the like, rather than leaving that to a user to find out and do. The disclosed system and method may avoid a scenario in which a human user would either overlook that certain flows needed to be allowed to enable applications to still function, or allow too many flows in order to avoid the first problem but thus making the target environment less secure.

Figure 1A:
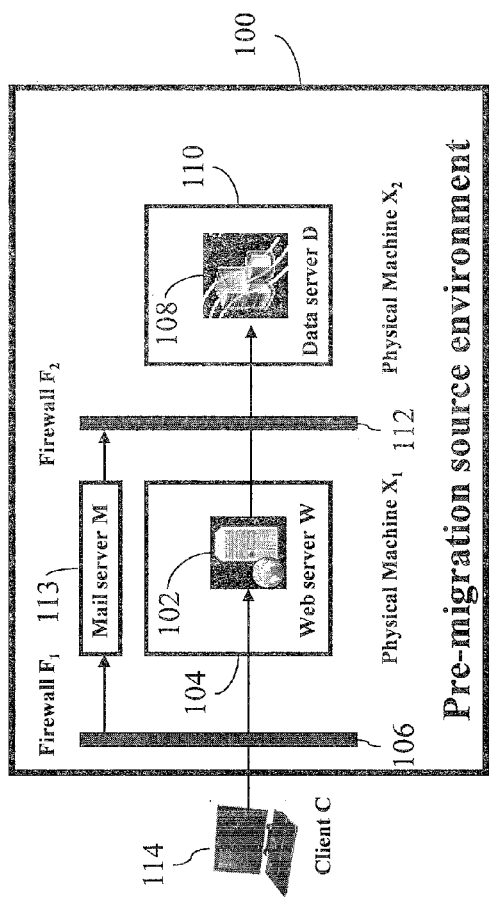
FIGS. 1A and 1B illustrate firewall reconfiguration concept in one embodiment.
Figure 1B:
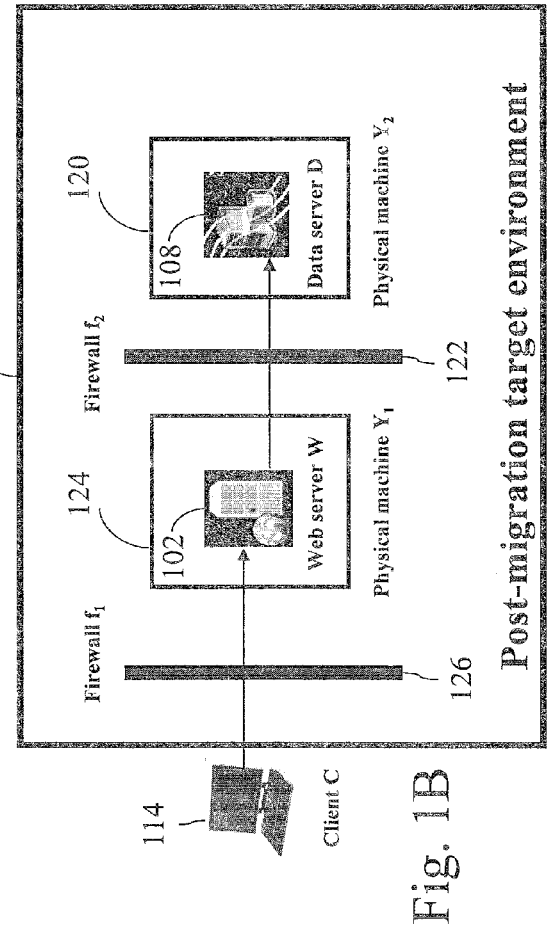

FIGS. 1A and 1B illustrate the firewall reconfiguration concept in one embodiment. FIG. 1A illustrates a pre-migration source enterprise environment in which a web server 102 running on machine $X_1$ 104 may be protected by a firewall at 106, and a data server 108 running on machine $X_2$ 110 may be protected by a firewall at 112. In this source environment, firewalls 106 and 112 are configured such that a client 114 would be able to access the web server at 102 through the firewall at 106 and that the web server at 102 would be able to access the data server at 108 through the firewall at 112. The figure also shows a mail server 113 that is not migrated, or at least not at this point in time or not to the same target environment. This is only one example of how the application structure or network structure may change in the target environment.

Figure 4A:
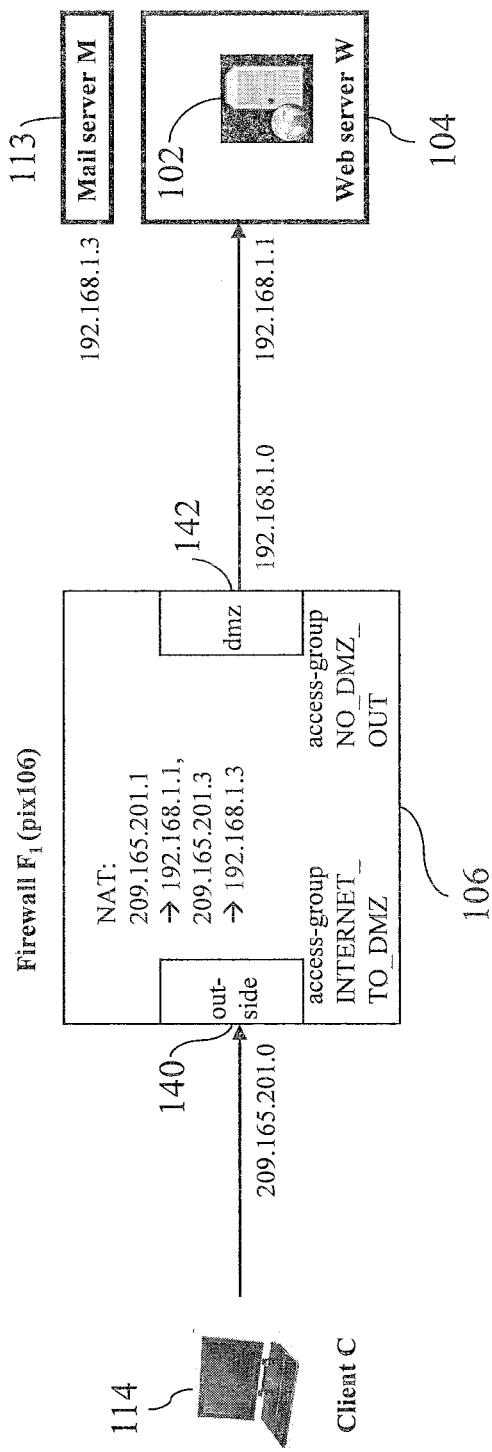
FIGS. 4A and 4B illustrate example firewall configuration in one embodiment.

For illustrative purposes, assume that both firewalls are CISCO™ PIX devices. FIG. 4A illustrates an example of the addresses and source firewall configuration. Let pix 106 be the hostname of the firewall at 106. The firewall has two interfaces, dmz and outside. The dmz interface 142 (ip address=192.168.1.0) is the higher security interface, while the outside interface 140 (ip address=209.165.201.0) is the lower security interface. Private addressing is used for the web server at 102 (ip address=192.168.1.1, network address translation (NAT)—outside=209.165.201.1) located behind the dmz interface. Since the dmz interface is a higher security interface than the outside interface, any traffic initiated from the DMZ to the Internet will be permitted by default. But, suppose that (as this server may be attacked from the outside), access to the Internet should only be allowed from the services that the server provides. Also suppose that mail server 113, which is not migrated, has the addresses (ip address=192.168.1.3, NAT-outside=209.165.201.3). In that case, the firewall at 106 may be configured as follows (part of the configuration file):

```
hostname pix106
nameif ethernet0 outside security0
nameif ethernet1 dmz security100
ip address outside 209.165.201.1 255.255.255.0
ip address dmz 192.168.1.0 255.255.255.0
nat (dmz) 1 192.168.1.0 255.255.255.0 0 0
global 1 209.165.201.1-209.165.201.254 netmask 255.255.255.0
access-list NO_DMZ_OUT permit tcp 192.168.1.1 any eq 80
access-list NO_DMZ_OUT permit tcp 192.168.1.1 any eq https
access-list NO_DMZ_OUT permit tcp 192.168.1.3 any eq smtp
access-list NO_DMZ_OUT deny ip any any
access-group NO_DMZ_OUT in interface dmz
static (dmz, outside) 209.165.201.1 192.168.1.1 netmask 255.255.255.255 0 0
access-list INTERNET_TO_DMZ permit tcp any 209.165.201.1 eq web
access-list INTERNET_TO_DMZ permit tcp any 209.165.201.1 eq https
access-list INTERNET_TO_DMZ permit tcp any 209.165.201.3 eq smtp
access-group INTERNET_TO_DMZ in interface outside
```

This example contains two access lists. The list INTERNET_TO_DMZ is associated to interface outside (see last line) and defines what traffic is allowed to enter by this interface. The list NO_DMZ_OUT is associated to interface dmz (see $6^{th}$ last line) and defines what traffic is allowed to enter by that interface. The line that allows normal, unencrypted web traffic from client 114 to web server 102 is "access-list INTERNET_TO_DMZ permit tcp any 209.165.201.1 eq web". The field "access-list INTERNET_TO_DMZ" defines to what access list this rule belongs. The field "permit" means that it is a rule that permits (rather than denies) traffic. The field "tcp" refers to the protocol used. The next field "any" refers to the source IP address of the incoming traffic and says that this could be an arbitrary address (and thus in particular that of client 114). The field "209.165.201.1" refers to the target address of the incoming traffic and specifically denotes the outwardly visible address of web server 102. The last field "eq web" refers to the target port of the incoming traffic, here in symbolic notation ("web", not "80"), and means that specifically traffic to port 80 is permitted by this rule.

Note that this access-list INTERNET_TO_DMZ does not need a final rule with fields "deny ip any any" like the access list NO_DMZ_OUT because the fields "security0" and "security100" in the first two lines define concepts of higher and lower security, which imply a default of "deny" for the interface "outside" because the traffic would go from a lower to a higher network zone.

The lines starting "nat" and "global" together define a network address translation rule. They are linked by the ID field "1". They define that the entire outside address range 209.165.201.1 to 209.165.201.254 are translated to corresponding dmz addresses starting 192.168.1; FIG. 4A only shows the two instances of these translations.

Figure 4B:
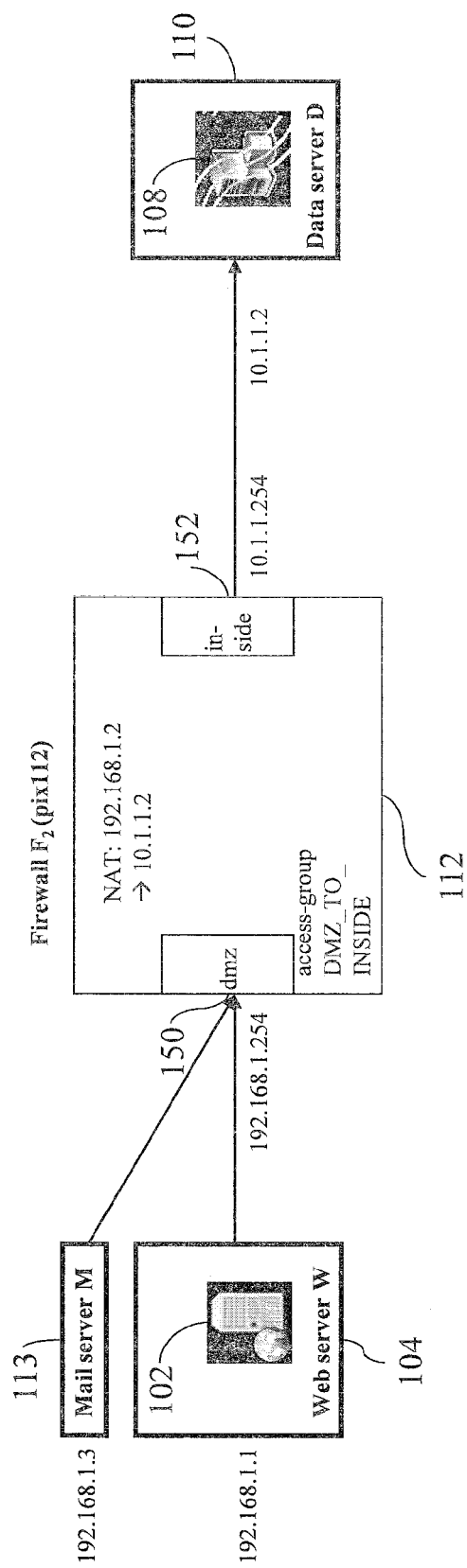

Similarly, let pix 112 be the hostname of the firewall at 112 as shown in FIG. 4B. The firewall has two interfaces, dmz and inside. The dmz interface (ip address=192.168.1.254) is the lower security interface, while inside (ip address=10.1.1.254) is the higher security interface. Private addressing is used for the data server at 108 (ip address=10.1.1.2, NAT-dmz=192.168.1.2) located behind the inside interface. Since the inside interface is a higher security interface than the dmz interface, any traffic initiated from the internal network to the dmz will be permitted by default.

The firewall at 112 may be configured as follows (part of the configuration file):

```
hostname pix112
nameif ethernet0 dmz security0
nameif ethernet1 inside security100
ip address dmz 192.168.1.254 255.255.255.0
ip address inside 10.1.1.254 255.255.255.0
nat (inside) 1 10.1.1.0 255.255.255.0 0 0
global 1 192.168.1.0-192.168.1.254 netmask 255.255.255.0
static (inside, dmz) 192.168.1.2 10.1.1.2 netmask 255.255.255.255 0 0
access-list DMZ_TO_INSIDE permit tcp any 192.168.1.2 eq 50000
access-group DMZ_TO_INSIDE in interface dmz
```

Here in particular the last access-list line denotes that traffic from any address is permitted to the data server (address 192.168.1.2 before address translation) on port 50000, which is assumed to be the database port in this example. A stricter rule might be to only permit such traffic from the web server, by replacing "any" with "192.168.1.1".

The above rules are the firewall rules in the source environment 100.

In migrating the web server and the data server to a new environment, referred to herein as the target environment as shown in FIG. 1B, the system and method of the present disclosure may automatically discover the firewall reconfiguration needs and apply those needs such that the client 114 can access the web server 102 running on the machine at 124 in the target environment and that the web server 102 running on the machine at 124 can access the data server 108 running on the machine at 120 in the target environment.

In one aspect, automated discovery technologies may be used to identify the host and firewall configurations in the pre-migration source environment 100 that need to be replicated with appropriate changes in the post-migration target environment 199. Automated analysis performed may include analyzing firewall configurations (e.g., by analyzing the firewall configurations such as those shown above), and analyzing network status information at the source environment host, for instance, by examining the runtime or system status by issuing status commands such as netstat. Automated analysis may also include network flow analysis, network log analysis, analyzing configured dependencies in middleware and application configurations, and analyzing dependencies directly in a code or program or the like. For example, analysis of the netstat command executed on the web server 102 may show the existence of connectivity between 192.168.1.1: 5678 (application port) and 192.168.1.2:50000 (DB2 port on the data server 108).

If hostnames are detected, for example, in configured dependencies, for example, the connection from the web server 102 to the data server 108 is detected via configurations as "an IHS server on host www.example.com links to database EXDATA at port 50000 on server data.example.com", the source port (5678 in the above example) would not be known because it is not specified, typically. Further, each server may have several IP addresses. In such cases, IP addresses need not be translated at this point, but only later for setting appropriate target rules.

Note that it is not always possible to obtain the exact firewall rules of the source environment, e.g., because of organizational difficulties. For instance, the network infrastructure may be outsourced and it may be hard to obtain detailed firewall rules from the network provider. Even where firewall configurations can be obtained, it may be useful to analyze additional data sources as mentioned above, in particular if some applications are separated by a firewall in the target environment that were not separated by a firewall in the source environment due to changes of the network structure. For instance, some applications may be moved to a remote data center or a cloud, while others remain closer to the business operation. Another reason to analyze additional data besides known firewall rules is if the firewall rules contain broad "permit" rules with "any" fields, and one may want more precise rules in the target environment, e.g., because fewer applications are in the same zone as before, or even just to increase security. These last cases may need checking by a human expert in practice.

Figure 2:
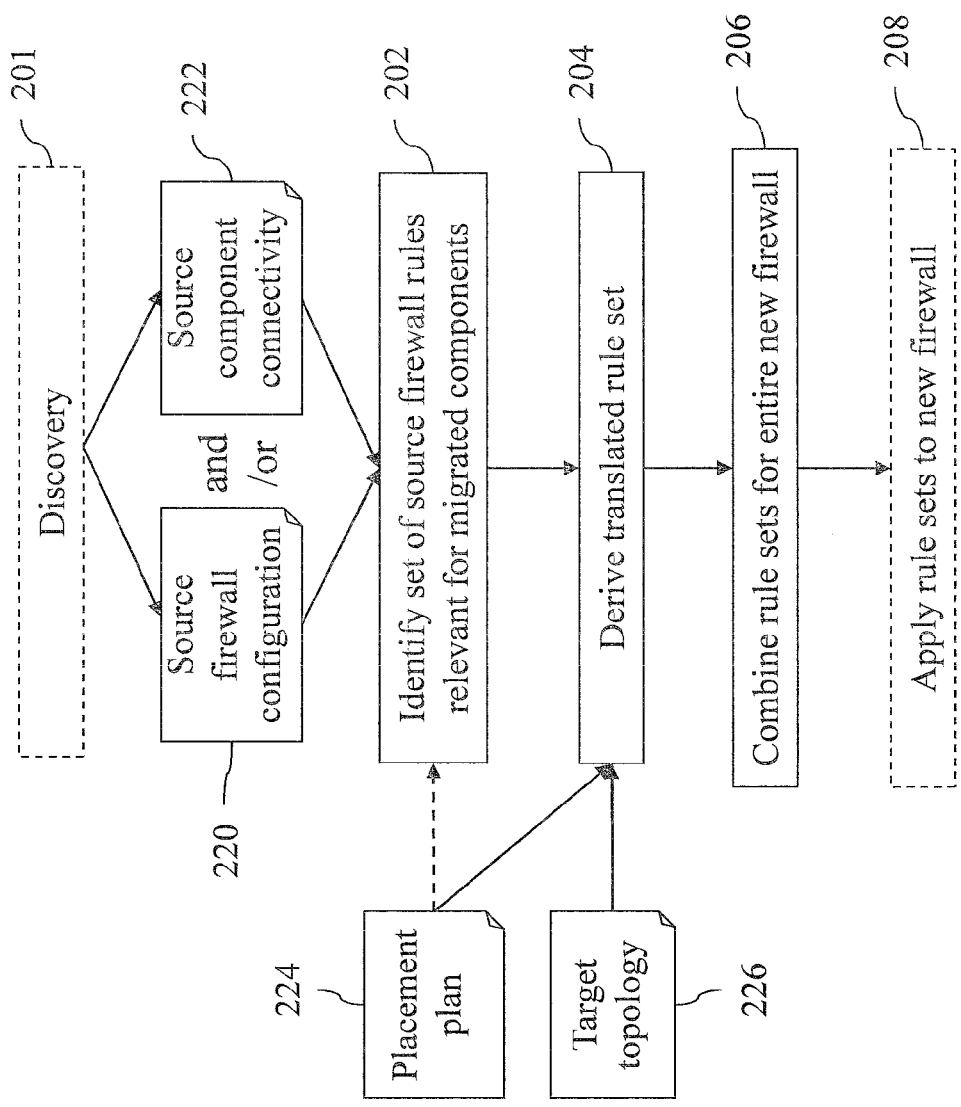
FIG. 2 is a flow diagram showing firewall reconfiguration based on firewall configuration analysis in one embodiment of the present disclosure.

FIG. 2 is a flow diagram showing firewall reconfiguration based on firewall configuration analysis in one embodiment of the present disclosure. Typically it starts with a discovery step 201, the result of which is one or both of a source firewall configuration 220 or the source component connectivity 222, i.e., active or configured connections. State-of-the art methods are available for this step, e.g., "sh conf" command on CISCO™ PIX firewalls to obtain firewall configuration, and using general discovery tools such as IBM® Tivoli® Application Dependency Discovery Manager and the IBM Research Galapagos tool (Kostas Magoutis, Murthy Devarakonda, Nikolai Joukov, and Norbert G. Vogl: Galapagos: Model-driven discovery of end-to-end application-storage relationships in distributed systems; IBM Journal of Research and Development Vol. 52, No4/5, 2008). Step 202 involves the identification of a set R of source firewall rules relevant for migrated components.

Given a source firewall configuration, R is the subset of its rules that is relevant to at least one component being migrated to the post-migration environment. The components being migrated may be given in placement plan 224 for the migration. In the above example, the set R will be the rules ensuring that the requests from the client 114 through the web server 102 to the data server 108 can still be fulfilled in an end-to-end fashion, as well as the rule that denies many other traffic to and from these servers The identification of set R is accomplished by finding all firewall configuration rules (i.e., lines starting "access-list" in the above examples) that comprise an ip address of one or more migrated servers, By "comprise" we mean that an address range (i.e., a concrete address, any, or an address with wildcards such as 192.168.1.*), evaluated on the corresponding interface of the firewall, contains an address of this server, (e.g., 192.168.1.* comprises, among others, 192.168.1.0 and 192.168.1.1). In the example of firewall pix 106 above, the subset of firewall configuration rules relevant for migration is highlighted in bold. Note that since the mail server (smtp server) guarded by the firewall pix 106 is not migrated, the corresponding firewall rules are not highlighted and are not relevant in the post-migration environment. If also it is known on what ports a server actually listens, an additionally check may be performed to determine whether a rule comprises at least one of these ports. In this example, the first five lines are not actually migrated (the new firewall may have a different name, different interface names, and different IP addresses), but are needed to interpret the following lines.

The method of the present disclosure may also discover network flows, for instance, that actually occurred or that are configured. If the method of the present disclosure discovers such network flows instead of the firewall configuration, then the set of all these flows becomes the rule set R that is relevant for migration.

The discovery step 201 may begin by analyzing the source components that are to be potentially migrated. In addition, all firewalls and routers through which traffic between the components might flow may be typically discovered. In one aspect, information obtained from netstat and/or configured dependency analysis may be sufficient, in which case, all firewalls and routers through which traffic between the components might flow need not be discovered. Additional discoveries, for instance, to determine information such as from which source firewalls to take the information for which components for which target firewall, may be made for example if some components were divided by two firewalls before (different data centers) and afterwards only by one (moved into one data center with one firewall), or vice versa.

If it is decided to migrate only a subset of the components that were discovered (e.g., because there is a wave plan and one wave is being migrated currently), then the connections discovered may be restricted to those where one of the two components is actually migrated. Briefly, wave planning refers to grouping related components together so that they are migrated together and can be tested together in the target environment.

At 204, a placement plan is used. It states how names or addresses change from source environment 100 to target environment 199. In other words, the placement plan briefly describes where the components will be placed in the target environment. Both manual and automated mechanism may be used to derive placement plans in migrations.

TABLE 1

| Source | Target |
| --- | --- |
| www.example.com | www.newplace.com |
| data.example.com | db.newplace.com |
| mail.example.com | mail.example.com |
| . . . | . . . |

A placement plan may be a table (e.g., shown in Table 1), or list, or spreadsheet, or similar data structure, that determines source and target addresses for components being migrated. Similarly, there may be a table for IP address changes, and/or for the mapping of target hostnames to IP addresses. In some migrations, server names do not change and only IP addresses change (e.g., shown in Table 2). Other mappings between the source and target environment are possible.

TABLE 2

| Source | Target |
| --- | --- |
| 209.165.201.1 | 209.165.201.1 |
| 209.165.201.3 | 209.165.201.3 |
| 192.168.1.1 of web server 102 | 192.168.2.1 of web server 102 |
| 192.168.1.3 of mail server 113 | 192.168.1.3 of mail server 113 |
| 10.1.1.2 | 10.2.2.2 |
| 192.168.1.2 of firewall pix112 | 192.168.1.2 of firewall pix124 |

Note that as to network address translation, the description of the placement plan 224 already assumes that the target topology 226 (in the example shown in FIG. 1B) is known. The addresses starting "192.168.1.1" are local and may therefore occur in multiple places in both the source and target environment. Hence it is specified by what precise servers they are held; in the case of 192.168.1.2 from the source environment this is the firewall 112, which performs the network address translation.

Step 204 translates the set R of source firewall rules relevant for migrated components. The resulting translated set is referred to as R'. As a simple example case, the present disclosure uses an individual flow (i.e., source IP address, source port, destination IP address, destination port) or a firewall rule allowing such an individual flow. To translate the set R to set R', the method of the present disclosure looks up the source IP address in the placement table; if it occurs there, the method of the present disclosure replaces it by the corresponding address in the target environment, else the method of the present disclosure leaves it unchanged. Similarly, the method of the present disclosure looks up the destination IP address in the placement table; if it occurs there, the method of the present disclosure replaces it by the corresponding address in the target environment, else the method of the present disclosure leaves it unchanged.

Figure 5:
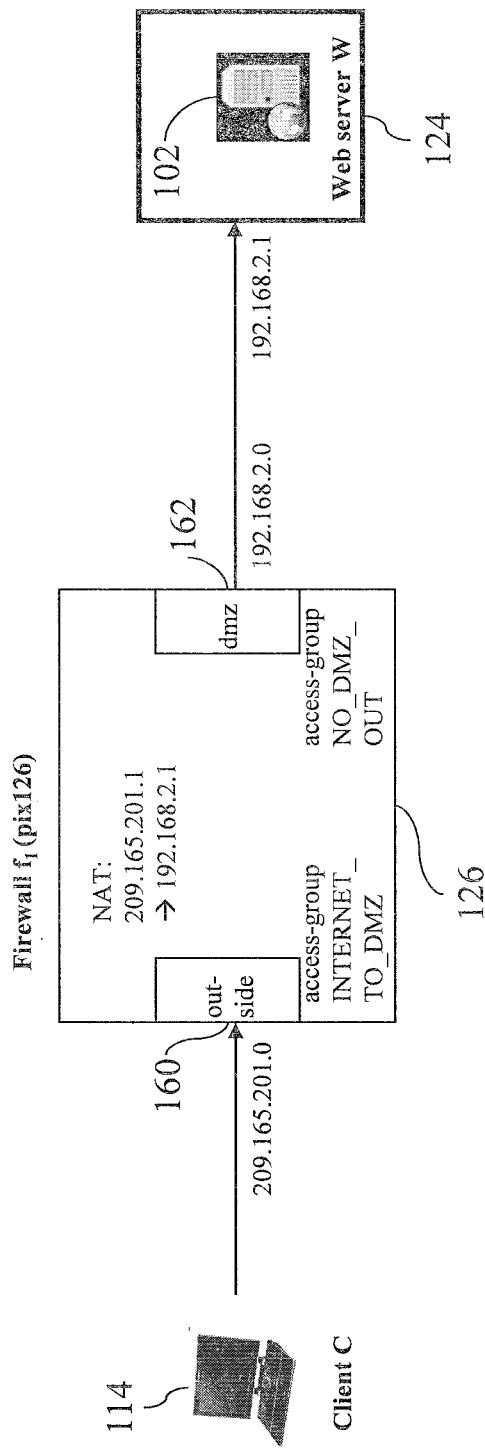
FIG. 5 shows an example of how web server may be migrated from its IP address in the source environment to a different IP address in the target environment.

For example, FIG. 5 shows how a web server 102 may be migrated from its IP address (e.g., ip address=192.168.1.1, NAT-outside=209.165.201.1) in the source environment to a different IP address (e.g., ip address=192.168.2.1, NAT-outside=209.165.201.1) in the target environment. In this example, the externally visible addresses of this server is unchanged post-migration, so that the client can continue to contact the web server at the same IP. Note that this is not a necessary condition for the approach disclosed in the present disclosure to work. That is, the externally visible address may change post-migration. In such cases, for example, the authoritative DNS servers are updated with the correct externally visible IP address for the mail server's host name. The firewall 126 separating the client and web server might have the following configuration rules:

```
hostname pix126
nameif ethernet0 outside security0
nameif ethernet1 dmz security100
ip address outside 209.165.201.1 255.255.255.0
ip address dmz 192.168.2.0 255.255.255.0
nat (dmz) 1 192.168.2.0 255.255.255.0 0 0
global 1 209.165.201.1-209.165.201.254 netmask 255.255.255.0
access-list NO_DMZ_OUT permit tcp 192.168.2.1 any eq 80
access-list NO_DMZ_OUT permit tcp 192.168.2.1 any eq https
access-list NO_DMZ_OUT deny ip any any
access-group NO_DMZ_OUT in interface dmz
static (dmz, outside) 209.165.201.1 192.168.2.1 netmask 255.255.255.255 0 0
access-list INTERNET_TO_DMZ permit tcp any 209.165.201.1 eq web
access-list INTERNET_TO_DMZ permit tcp any 209.165.201.1 eq https
```

Similarly, referring to FIG. 1B, suppose that the data server 108 is migrated from its IP address (ip address=10.1.1.2, NAT-dmz=192.168.1.2) in the source environment to a different IP address (say, ip address=10.1.3.2, NAT-dmz=192.168.2.2) in the target environment. The firewall 122 separating the web server and the data server might have the following configuration rules:

```
hostname pix122
nameif ethernet0 dmz security0
nameif ethernet1 inside security100
ip address dmz 192.168.2.254 255.255.255.0
ip address inside 10.1.3.254 255.255.255.0
nat (inside) 1 10.1.3.0 255.255.255.0 0 0
global 1 192.168.2.0-192.168.2.254 netmask 255.255.255.0
static (inside, dmz) 192.168.2.2 10.1.3.2 netmask 255.255.255.255 0 0
access-list DMZ_TO_INSIDE permit tcp any 192.168.2.1 eq 50000
```

If there is a firewall rule allowing multiple connections, what is migrated is split out. If there is a firewall rule explicitly forbidding one or more connections, what is migrated is split out. Note that order plays a role in most firewall configuration rule languages, e.g., in our example firewall pix 106 the rule "access_list NO_DMZ_OUT deny ip any any", which seems to forbid all traffic, is only reached if none of the earlier rules applies, which do permit some traffic. Hence both R and R' are actually rule lists (ordered), not sets in the strict mathematical sense (unordered). Furthermore, one needs to maintain an overall default value if the firewall configuration rule language defines one, such as the value of either "permit" or "deny" derived for each access group by the security levels in our examples.

Referring back to FIG. 2, the target topology 226 describes how the components in the target environment will be connected, and in particular where there are firewalls in the target environment.

At 206, translated rule list R' is inserted into the future configuration of the firewall 126 (FIG. 1B) in the target environment. As components from different areas of the overall source environment may be migrated into the same network zones of the target environment, this may require a combination of several rule sets. Combination of rule sets can be implemented by always combining (merging) one new rule set with the overall existing rule set up to that point.

Some firewall languages may simply have a merge operator, which may be used to merge the rules. Otherwise, all the individual "permit" rules from the beginning of the rule sets may be retained, followed by all the broader, lower-priority "deny" rules. If each rule set R was built from source component connectivity, it is necessarily of the form assumed here, because each observed or configured network flow gives a positive rule, and one may augment these by a "deny" rule for all other connections. Then the corresponding translated set R' is also of the same form. Many rule sets R derived by restricting firewall configurations to the migrated components will also be of this form. Otherwise, if there are concrete initial "deny" rules for specific components, one may let those prevail, i.e., retain them in front of "permit" rules from other sets.

In one aspect, conflicts may be resolved manually, in particular if none of the scenarios listed above applies. For example, if the firewall 126 had an explicit rule forbidding incoming http traffic, re-conciliation may be done manually. For instance, a decision is taken as to whether the zone guarded by firewall 126 (FIG. 1B) is the right zone for web server 102 to be migrated to. If the answer is yes, then the conflicting rule (e.g., the one forbidding incoming http traffic)

has to be restricted to the other servers already present in the zone (this is a better option than removing the rule altogether, because then the other servers will still have the similar protection as before).

Furthermore, the firewall rules in the source environment may be optionally changed, for instance, because once certain components have moved out, there may no longer be a need for rules for allowing their interaction. This is like a migration of the remaining component into a new environment where they are the only components; hence the steps above can be applied directly to this situation too. At 208, the new rules sets R' are applied to the new firewalls.

In addition to firewall reconfiguration, networking devices such as domain name servers, border gateways, and routers may need to be updated to ensure that all applications work as before. For instance, to ensure that client 114's future requests still reach web server 102, now on physical machine 124, the outside address 209.165.201.1 that client 114 still uses now has to be routed to firewall pix 126.

Figure 3B:
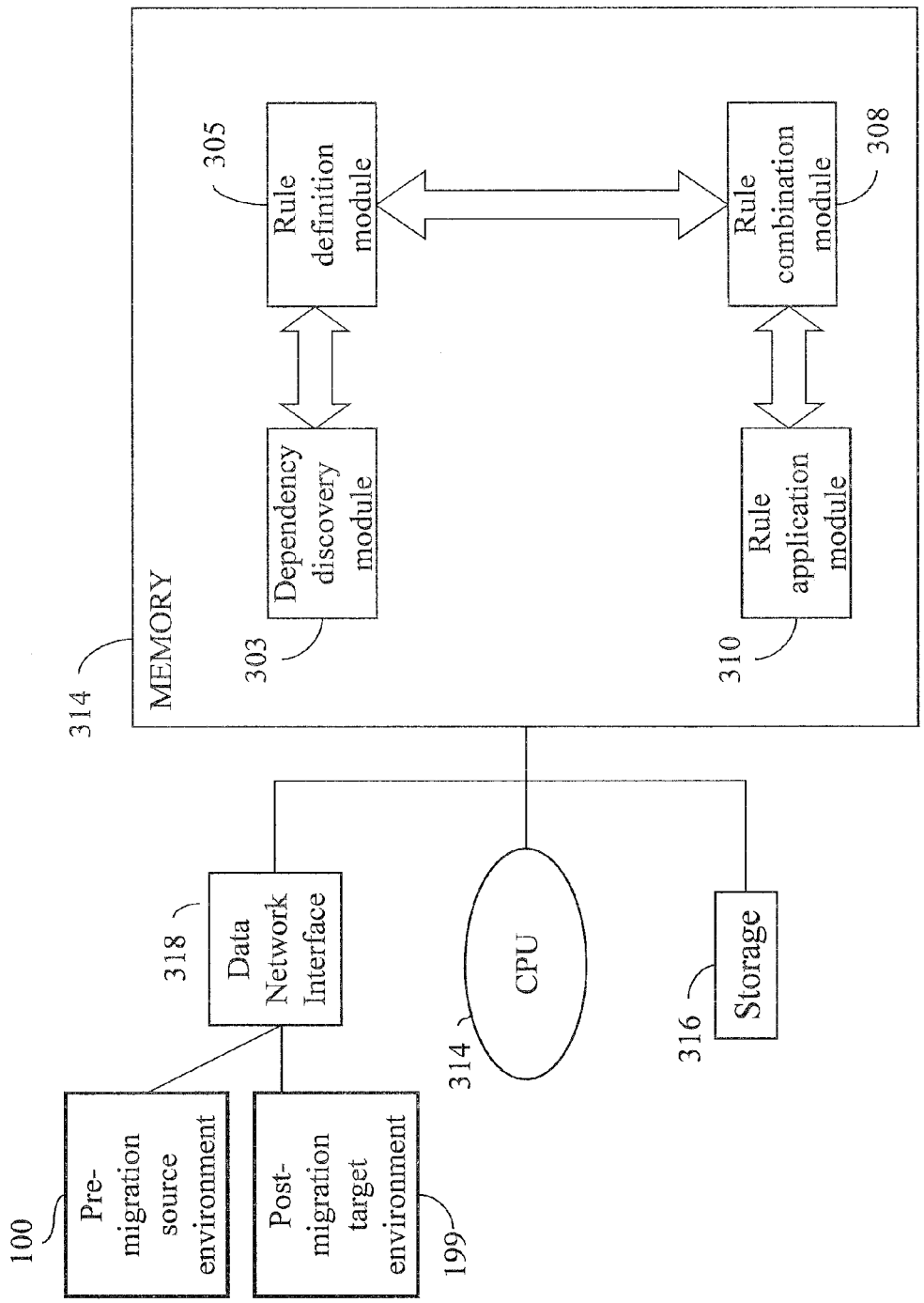

FIGS. 3A and 3B are architectural diagrams illustrating functional components for a system that performs firewall reconfiguration in migrations in one embodiment of the present disclosure. The modules shown in FIGS. 3A and 3B may be components of a computer system that may include any computing node that is able to load and execute programmatic code, for instance, running the operating system and server application suite. The system logic may be embodied as computer executable code that is loaded from a remote source (e.g., from a network file system), local permanent optical (CD-ROM), magnetic storage (such as disk), or storage 316 into memory 304 for execution by CPU 314. A network interface 318 may be used for communicating to other network accessible services. Such an interface 318 may include, but is not limited to a hardwired device, e.g., Ethernet over coax cable, wireless IP, and telephone to IP (VoIP), or others. The memory 304 may include computer readable instructions, data structures, program modules and application interfaces providing logic or functional components for impact analysis of part removal from complex products.

It should be understood that while FIGS. 3A and 3B illustrate the functional components residing in a computer system, the system and method of the present disclosure is not limited to only those configurations. Thus, the components may be distributed over a network on different platforms in a distributed environment, and/or configured in a cloud computing environment. Further, while FIGS. 3A and 3B show a CPU 314, the system may include multiple processors and/or cores.

A firewall rule discovery module 302 identifies network-level attributes of the source environment and the target environment. For example, firewall configuration files of source environment and target environment may be analyzed. Further, network activities may be analyzed, for example, real time and/or by analyzing log files. Such configuration files may be retrieved from pre-migration source environment 100 via a network 318, for example. A rule selection module 304 selects firewall rules, for example, in one or more firewall configuration files, that pertain to the components that are being migrated that have associated firewall configurations. A rule translation module 306 translates the selected firewall rules into the target environment firewall rules. A rule combination module 308 combines, if needed, the existing target environment firewall rules with the translated firewall rules for the components being migrated. A rule application module applies the translated and combined rules (if applicable) in the target environment, for instance, by modifying the target environment's firewall configuration files, for instance, at post-migration target environment 199.

Referring to FIG. 3B, a dependency discovery module 303 may identify components that are being migrated and additional components that interact with and/or are affected by those components being migrated, for instance, by analyzing the pre-migration source environment 100. A rule definition module 305 defines rules that would allow the components that are being migrated and the associated dependent components to interact via the network in the target environment. A rule combination module 308 combines, if needed, the rules defined in the rule definition module 305 with existing target environment firewall. A rule application module applies the combined rules (if applicable) to the post-migration target environment 199, for example, by modifying the configuration files such as network, firewall or other configuration files.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
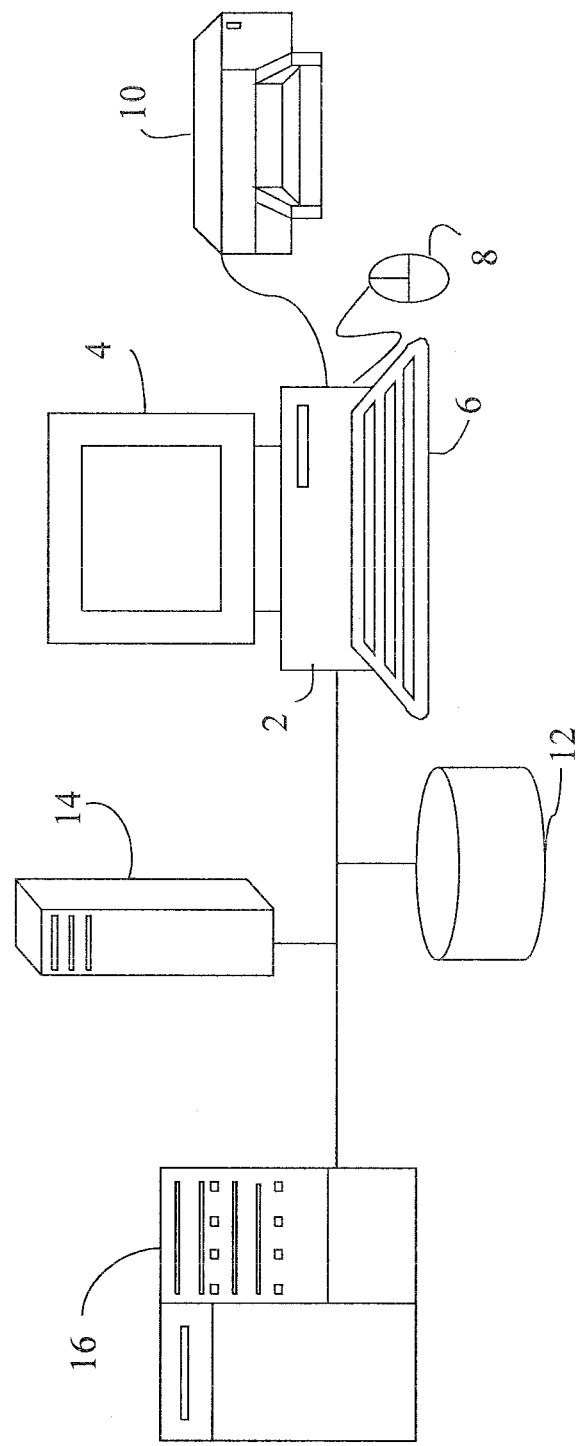
FIG. 6 illustrates an example of a computer system, in which the systems and methodologies of the present disclosure may be carried out or executed.

Referring now to FIG. 6, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for automating network reconfiguration in migrations, comprising:
    determining, using a computer processor, network reconfiguration needs in one or more network functionalities of target environment based on one or more network-level attributes associated with source environment and one or more network-level attributes associated with the target environment to which one or more components are being migrated from the source environment; and
    applying the network reconfiguration needs to the one or more network functionalities in the target environment,
    wherein the target environment comprises one or more physical servers and the source environment comprises one or more physical servers comprising said one or more components to be migrated, wherein the one or more network-level attributes associated with the source environment are translated, wherein the one or more network-level attributes associated with the target environment are modified by merging the translated one or more network-level attributes associated with the source environment with the one or more network-level attributes associated with the target environment,
    wherein the method further comprises automatically discovering the one or more network-level attributes associated with the source environment of said one or more components to be migrated,
    wherein the determining network reconfiguration needs comprises:
        identifying one or more rules in source environment's network configuration relevant to said one or more components to be migrated;
        translating the one or more rules to include target environment's network configuration; and
        applying the translated one or more rules in the target environment.

2. The method of claim 1, wherein the discovering one or more network-level attributes associated with source environment includes one or more of:
    performing analysis of firewall configuration files associated with the source environment; or
    observing run-time network flow at the source environment; or
    analyzing configured dependencies at one or more servers running on the source environment; or
    analyzing firewall log files; or
    combinations thereof.

3. The method of claim 1, wherein the network reconfiguration needs include firewall reconfiguration needs.

4. The method of claim 1, wherein the source environment's network configuration includes source environment's firewall configuration and the target environment's network configuration includes target environment's firewall configuration, and wherein the step of applying includes modifying the target environment's firewall interface.

5. The method of claim 4, further including modifying the source environment's firewall configuration to delete one or more rules associated with the one or more components.

6. The method of claim 1, wherein the applying the translated one or more rules in the target environment includes merging the translated one or more rules with existing rules in the target environment.

7. The method of claim 1, wherein the applying the network reconfiguration needs includes making changes in network configuration files of the target environment.

8. The method of claim 1, further including making changes in dynamic DNS.

9. A non-transitory computer readable storage medium storing a program of instructions executable by a machine to perform a method of automating network reconfiguration in migrations, comprising:
    determining, network reconfiguration needs in one or more network functionalities of target environment based on one or more network-level attributes associated with source environment and one or more network-level attributes associated with the target environment to which one or more components are being migrated from the source environment; and
    applying the network reconfiguration needs to the one or more network functionalities in the target environment,
    wherein the target environment comprises one or more physical servers and the source environment comprises one or more physical servers comprising said one or more components to be migrated, wherein the one or more network-level attributes associated with the source environment are translated, wherein the one or more network-level attributes associated with the target environment are modified by merging the translated one or more network-level attributes associated with the source environment with the one or more network-level attributes associated with the target environment, wherein the method further comprises automatically discovering the one or more network-level attributes associated with the source environment of said one or more components to be migrated, wherein the determining network reconfiguration needs comprises:

identifying one or more rules in source environment's network configuration relevant to said one or more components to be migrated;

translating the one or more rules to include target environment's network configuration; and applying the translated one or more rules in the target environment.

10. The non-transitory computer readable storage medium of claim 9, wherein the discovering one or more network-level attributes associated with source environment includes one or more of:

performing analysis of firewall configuration files associated with the source environment; or observing run-time network flow at the source environment; or analyzing configured dependencies at one or more servers running on the source environment; or analyzing firewall log files; or combinations thereof.

11. The non-transitory computer readable storage medium of claim 9, wherein the network reconfiguration needs include firewall reconfiguration needs.

12. The non-transitory computer readable storage medium of claim 9, wherein the source environment's network configuration includes source environment's firewall configuration and the target environment's network configuration includes target environment's firewall configuration, and wherein the step of applying includes modifying the target environment's firewall configuration.

13. The non-transitory computer readable storage medium of claim 9, wherein the applying the translated one or more rules in the target environment includes merging the translated one or more rules with existing rules in the target environment.

14. A system for network reconfiguration in migrations, comprising:

a computer processor;

a module operable to execute on the computer processor and determine network reconfiguration needs in one or more network functionalities of target environment based on one or more network-level attributes associated with source environment and one or more network-level attributes associated with the target environment to which one or more components are being migrated from the source environment; and a rule application module operable to apply the network reconfiguration needs to the one or more network functionalities in the target environment, wherein the target environment comprises one or more physical servers and the source environment comprises one or more physical servers comprising said one or more components to be migrated, wherein the one or more network-level attributes associated with the source environment are translated, wherein the one or more network-level attributes associated with the target environment are modified by merging the translated one or more network-level attributes associated with the source environment with the one or more network-level attributes associated with the target environment, the system further comprising a discovery module operable to discover said one or more network-level attributes associated with source environment, wherein the module is further operable to determine network reconfiguration needs by identifying one or more rules in source environment's network configuration relevant to said one or more components to be migrated, translating the one or more rules to include target environment's network configuration, and applying the translated one or more rules in the target environment.

15. The system of claim 14, wherein the module is operable to identify one or more rules in source environment's network configuration relevant to one or more components being migrated, and the system further includes a translation module operable to translate the one or more rules to include target environment's network configuration.

16. The system of claim 15, wherein the rule application module modifies the target environment's network configuration by including the translated one or more rules.

17. The system of claim 16, wherein the target environment's network configuration includes firewall configuration.

18. The method of claim 1, further including:

automatically discovering, using the computer processor, the one or more network-level attributes associated with target environment of one or more components being migrated.

19. The method of claim 18, wherein the discovering one or more network-level attributes associated with target environment includes performing analysis of firewall configuration files associated with the target environment.

20. The non-transitory computer readable storage medium of claim 9, further including:

automatically discovering the one or more network-level attributes associated with target environment of one or more components being migrated.

* * * * *